US012209714B1

(12) United States Patent
Wang et al.

(10) Patent No.: US 12,209,714 B1
(45) Date of Patent: Jan. 28, 2025

(54) CONVENIENTLY-MOUNTED SPLIT SIDE-EMITTING SMALL PANEL LAMP

(71) Applicant: Hengdian Group Tospo Lighting Co., Ltd., Zhejiang (CN)

(72) Inventors: Xiaoxing Wang, Zhejiang (CN); Le Wang, Zhejiang (CN); Jinli Shan, Zhejiang (CN); Jinghang Zhou, Zhejiang (CN); Ying Ye, Zhejiang (CN); Heng Li, Zhejiang (CN)

(73) Assignee: HENGDIAN GROUP TOSPO LIGHTING CO., LTD., Zhejiang (CN)

( * ) Notice: Subject to any disclaimer, the term of this patent is extended or adjusted under 35 U.S.C. 154(b) by 0 days.

(21) Appl. No.: 18/543,643

(22) Filed: Dec. 18, 2023

(30) Foreign Application Priority Data

Jul. 18, 2023 (CN) ......................... 202321889820.1

(51) Int. Cl.

| | |
|---|---|
| ***F21K 9/237*** | (2016.01) |
| ***F21K 9/61*** | (2016.01) |
| ***F21K 9/68*** | (2016.01) |
| ***F21V 19/00*** | (2006.01) |
| ***F21V 21/088*** | (2006.01) |
| *F21W 131/30* | (2006.01) |
| *F21Y 103/33* | (2016.01) |
| *F21Y 115/10* | (2016.01) |

(52) U.S. Cl.

CPC ................ *F21K 9/237* (2016.08); *F21K 9/61* (2016.08); *F21K 9/68* (2016.08); *F21V 19/0025* (2013.01); *F21V 21/088* (2013.01); *F21W 2131/30* (2013.01); *F21Y 2103/33* (2016.08); *F21Y 2115/10* (2016.08)

(58) Field of Classification Search

CPC ...... F21V 21/088; F21V 19/0025; F21K 9/68; F21K 9/61; F21K 9/237

See application file for complete search history.

(56) References Cited

U.S. PATENT DOCUMENTS

| | | | | |
|---|---|---|---|---|
| 2019/0101257 | A1* | 4/2019 | Boulanger | F21V 23/007 |
| 2020/0271281 | A1* | 8/2020 | Huang | F21S 8/026 |
| 2022/0065410 | A1* | 3/2022 | Huang | F21V 23/008 |

FOREIGN PATENT DOCUMENTS

| | | | | | |
|---|---|---|---|---|---|
| CN | 214670012 | U | * | 11/2021 | |
| GB | 2585705 | A | * | 1/2021 | A62C 35/68 |

OTHER PUBLICATIONS

Innovation Q+ NPL Search (Year: 2024).*

* cited by examiner

*Primary Examiner* — Anabel Ton

(74) *Attorney, Agent, or Firm* — McCormick, Paulding & Huber PLLC

(57) ABSTRACT

A conveniently-mounted split side-emitting small panel lamp belongs to the technical field of light-emitting diode (LED) lamps. The conveniently-mounted split side-emitting small panel lamp includes a rear cover; an inner wall of the rear cover is connected to a light source module; reflective paper, a light guide plate, and a diffusion plate are arranged inside the rear cover in sequence from top to bottom; a surface ring is connected below the rear cover, where several clamping blocks are arranged at an edge of the rear cover; the surface ring is provided with clamping slots corresponding to the clamping blocks; a connection terminal is connected above the rear cover; and symmetrically arranged springs are further connected above the rear cover.

7 Claims, 7 Drawing Sheets

CONVENIENTLY-MOUNTED SPLIT SIDE-EMITTING SMALL PANEL LAMP

CROSS-REFERENCE TO RELATED APPLICATION

This application claims foreign priority benefits under 35 U.S.C. § 119 from Chinese Patent Application No. 202321889820.1, filed Jul. 18, 2023, the content of which is hereby incorporated by reference in its entirety.

TECHNICAL FIELD

The present disclosure belongs to the technical field of light-emitting diode (LED) lamps, and particularly, to a conveniently-mounted split side-emitting small panel lamp.

BACKGROUND

A split side-emitting small panel is a highly popular LED lamp in the North American market, and is mainly used in the new decoration market. Due to its uniformity of luminescence and ultra-thin appearance, the split side-emitting small panel is widely used.

According to existing assembling methods for side-emitting small panels on the market, in most of which, various structural components of a lamp are fixed by screws, so that the assembling is time-consuming. In addition, multiple screw materials are also required, which can easily cause production abnormalities due to the influence of the materials during production.

SUMMARY

In order to solve the problems mentioned in the background section, the present disclosure provides a conveniently-mounted split side-emitting small panel lamp, which has the characteristic of ease and convenience in mounting.

In order to achieve the above objective, the present disclosure provides the following technical solution: A conveniently-mounted split side-emitting small panel lamp includes a rear cover; an inner wall of the rear cover is connected to a light source module; a reflective sheet, a light guide plate, and a diffusion plate are arranged inside the rear cover in sequence from top to bottom; a surface ring is connected below the rear cover, wherein one or more clamping blocks are arranged at an edge of the rear cover; the face ring is provided with one or more clamping slots corresponding to the clamping blocks; a connection terminal is connected above the rear cover; and symmetrically arranged springs are further connected above the rear cover.

Further, in order to facilitate rotating the clamping blocks into the clamping slots and prevent the rear cover from being rotated out, each clamping slot is of a side-opening structure, and an open end is connected to a barb.

Further, in order to achieve fast mounting of the springs, each spring comprises connecting edges forming a sleeving member, a limiting sleeve is connected above the rear cover, and a first limiting bulge is arranged on a side of the limiting sleeve. The sleeving member may sleeve the first limiting bulge by passing through the limiting sleeve.

Further, in order to limit the springs, a second limiting bulge is provided on a side of the first limiting bulge away from the limiting sleeve. The sleeving member may be limited by the first limiting bulge and the second limiting bulge.

Further, in order to achieve fast mounting of the connection terminal, the rear cover is provided with a connecting slot; a lower end of the connection terminal is connected to a lower limiting block corresponding to the connecting slot; and an upper limiting ring is connected above the lower limiting block.

Further, in order to enable the split side-emitting small panel lamp to have the function of a small night lamp, a washer located on an outer side of the rear cover is arranged above the surface ring, and a night light source is connected to the outer side of the rear cover. The outer side of the rear cover is connected to a light guide stand.

Further, in order to facilitate a fast connection between the light guide stand and the surface ring, one or more insertion buckles are arranged at an edge of the light guide stand, and the surface ring is provided with one or more insertion slots corresponding to the insertion buckles.

Compared with the prior art, the present disclosure has the beneficial effects below:

1. The rear cover and the surface ring of the present disclosure are connected to each other after the clamping blocks are rotated into the clamping slots, thus achieving fixation of the reflective sheet, the light guide plate, and the diffusion plate inside, without connection by screws, so that the split side-emitting small panel lamp is more convenient to mount.
2. Each clamping slot of the present disclosure is of the side-opening structure, and the open end is connected to the barb, so that it is convenient to rotate the clamping blocks into the clamping slots to cause the barbs to limit the clamping blocks and prevent the rear cover from being rotated out.
3. The limiting sleeve is connected above the rear cover of the present disclosure, and the first limiting bulge is arranged on the side of the limiting sleeve, so that connecting edges of the springs sleeve the first limiting bulge through the limiting sleeve to achieve fast mounting of the springs.
4. In the present disclosure, the lower limiting block passes through the connecting slot, and the connection terminal is then rotated 90 degrees, so as to achieve fast mounting of the connection terminal. The upper limiting ring and the lower limiting block are both made of rubber, which can also seal the connecting slot to ensure the waterproof and shading effect of the whole lamp.
5. In the present disclosure, the washer located on the outer side of the rear cover is arranged above the surface ring; the night light source is connected to the outer side of the rear cover; and the outer side of the rear cover is connected to the light guide stand, so that the split side-emitting small panel lamp has the function of a small night lamp.

BRIEF DESCRIPTION OF THE DRAWINGS

The accompanying drawings are intended to provide a further understanding of the present disclosure and constitute a part of this specification. The accompanying drawings and the embodiments of the present disclosure are used together for explaining the present disclosure rather than constituting a limitation on the present disclosure. In the drawings.

Figure 1:
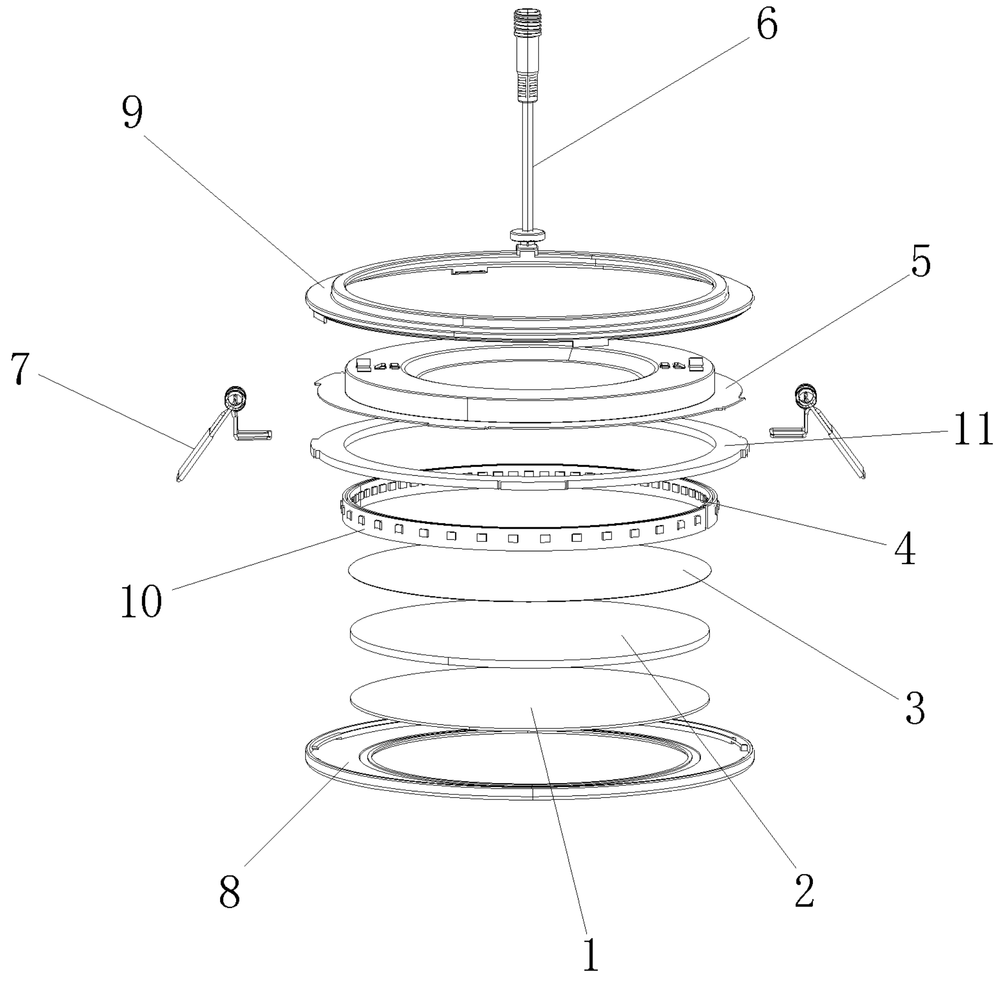
FIG. 1 is an exploded view of a structure of the present disclosure.
Figure 2:
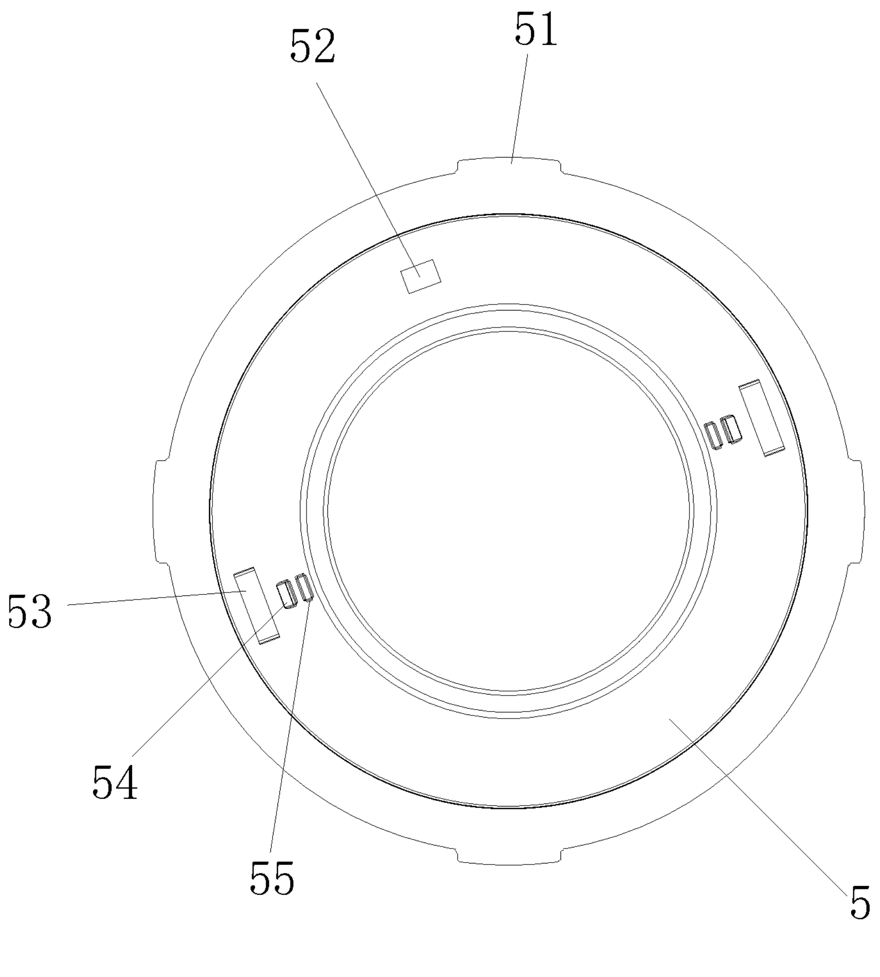
FIG. 2 is a schematic structural diagram of a rear cover of the present disclosure.
Figure 3:
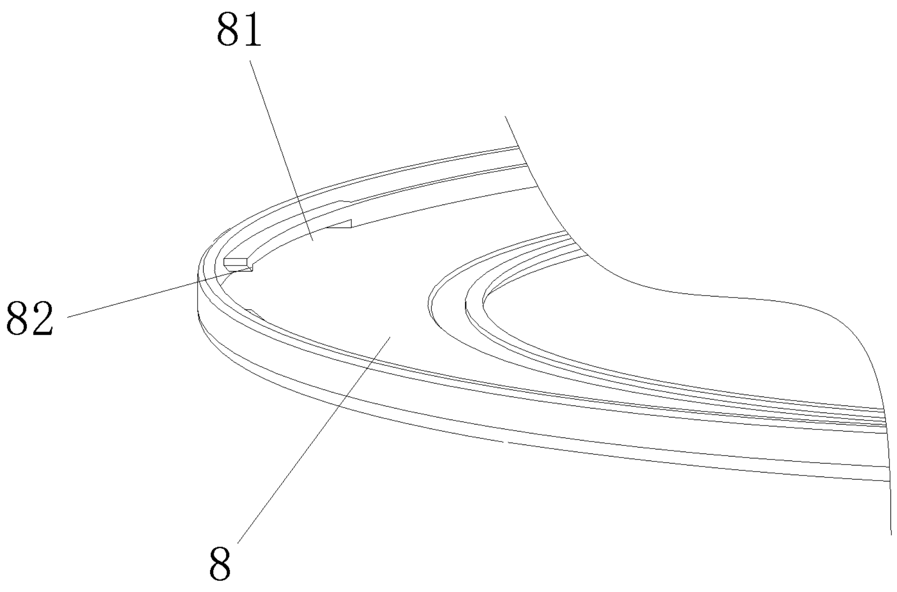
FIG. 3 and FIG. 4 are partially schematic structural diagrams of a surface ring of the present disclosure.
Figure 4:
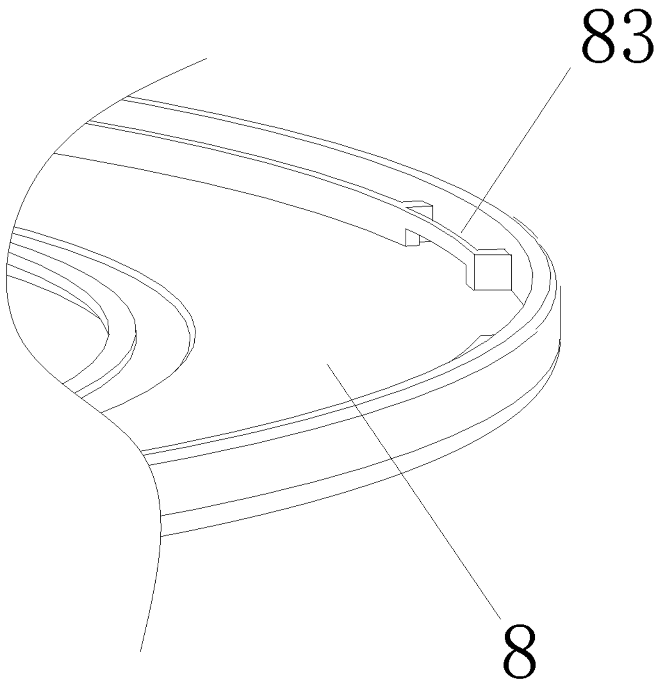
Figure 5:
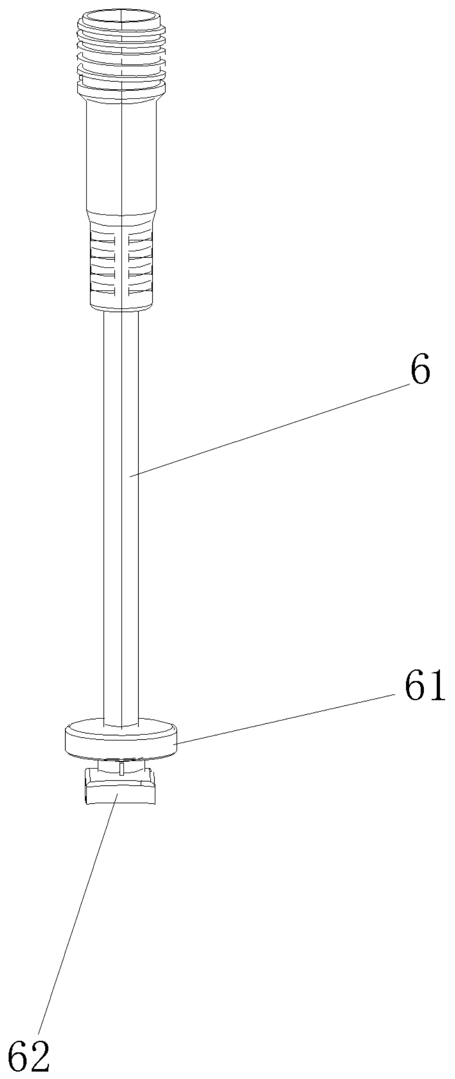
FIG. 5 is a schematic structural diagram of a connection terminal of the present disclosure.
Figure 6:
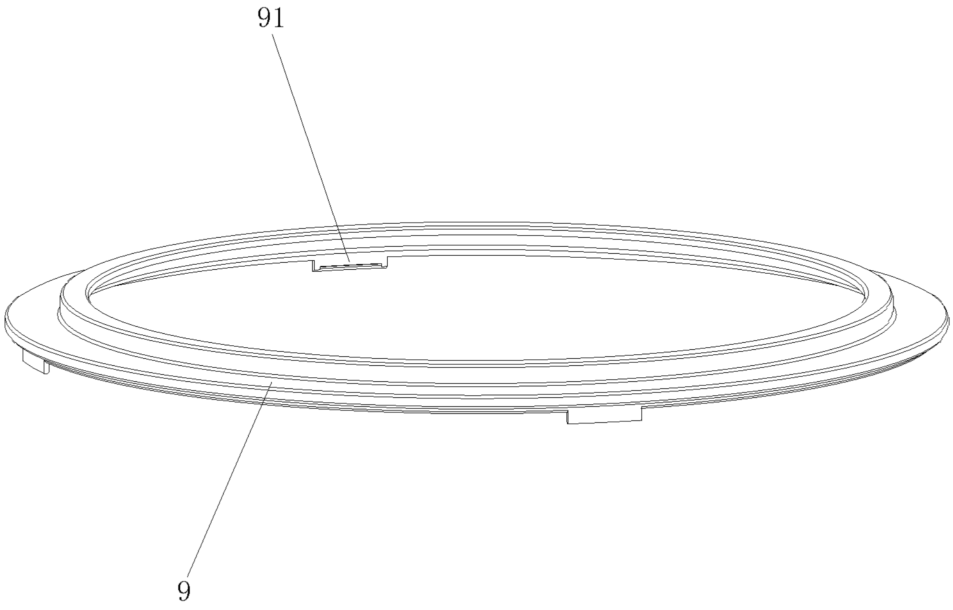
FIG. 6 is a schematic structural diagram of a light guide stand of the present disclosure.
Figure 7:
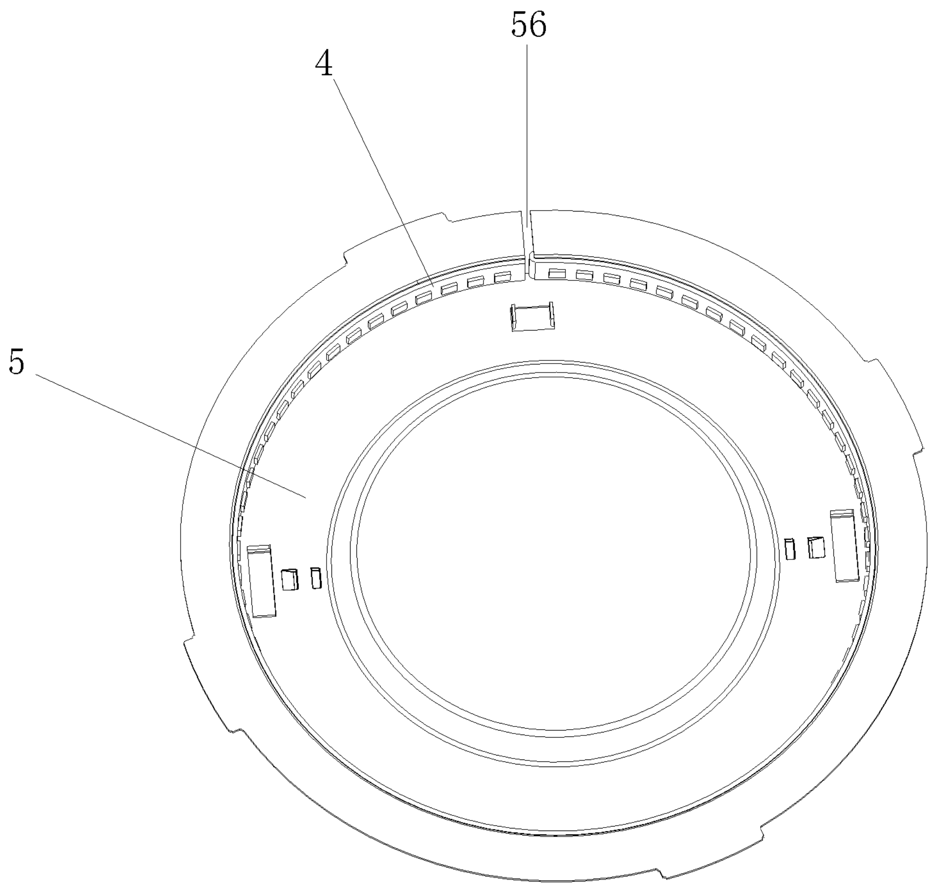
FIG. 7 is a schematic structural diagram of a connection between a light source module, as well as a night light source, and a rear cover of the present disclosure.

In the drawings: 1: diffusion plate; 2: light guide plate; 3: reflective sheet; 4: light source module; 5: rear cover; 51: clamping block; 52: connecting slot; 53: limiting sleeve; 54: first limiting bulge; 55: second limiting bulge; 56: notch; 6: connection terminal; 61: upper limiting ring; 62: lower limiting block; 7: spring; 8: surface ring; 81: clamping slot; 82: barb; 83: insertion slot; 9: light guide stand; 91: insertion buckle; 10: night light source; and 11: washer

DETAILED DESCRIPTION

The technical solutions in the embodiments of the present disclosure are clearly and completely described below with reference to the accompanying drawings in the embodiments of the present disclosure. Apparently, the described embodiments are merely some embodiments of the present disclosure, rather than all of the embodiments. All other embodiments obtained by a person of ordinary skill in the art based on the embodiments of the present disclosure without making creative efforts shall fall within the protection scope of the present disclosure.

Embodiment 1

Referring to FIG. 1 to FIG. 7, the present disclosure provides the following technical solution: A conveniently-mounted split side-emitting small panel lamp includes a rear cover 5, wherein an inner side wall of the rear cover 5 is adhered with a light source module 4; reflective sheet 3, a light guide plate 2, and a diffusion plate 1 are arranged inside the rear cover 5 in sequence from top to bottom; a surface ring 8 is connected below the rear cover 5, wherein three clamping blocks 51 are integrally formed on the perimeter of the rear cover 5. The blocks 51 may be distributed along the circumference of the rear cover 5. The surface ring 8 is provided with clamping slots 81 corresponding to the clamping blocks 51. The slots 81 may also be distributed along the circumference of the surface ring 8. A connection terminal 6 is connected above the rear cover 5; and a symmetrically arranged pair of springs 7 are further connected above the rear cover 5.

By the adoption of the above technical solution, the rear cover 5 and the surface ring 8 of the present disclosure are connected to each other after the clamping blocks 51 are rotated into the clamping slots 81, thus achieving fixation of the reflective sheet 3, the light guide plate 2, and the diffusion plate 1 inside, without connection by screws, so that the split side-emitting small panel lamp is more convenient to mount.

Specifically, each clamping slot 81 is of a side-opening structure. As an example, each slot 81 may have an opening on one side, while the opposite side is closed. The open end of the slot 81 is connected to a barb 82. The opening of the slot 81 allows the block 51 to rotate past the barb 82 and into the slot 81, after which the block 51 is restricted from rotating out by the barb 82.

By the adoption of the above technical solution, it is convenient to rotate the clamping blocks 51 into the clamping slots 81 to cause the barbs 82 to limit the clamping blocks 51 and prevent the rear cover 5 from being rotated out.

Embodiment 2

A difference between this embodiment and Embodiment 1 is as follows: Specifically, a limiting sleeve 53 is connected above the rear cover 5, and a first limiting bulge 54 is arranged on a side of the limiting sleeve 53.

Referring to FIG. 1, each spring 7 may have a plurality of connecting edges at the bottom thereof, and the connecting edges form a sleeving member. The sleeving member may be U-shaped. The sleeving member may comprise two opposing side edges and a front edge connected with the two opposing side edges. The sleeving member of the spring 7 may sleeve the first limiting bulge 54 by passing through the limiting sleeve 53. The two opposing side edges of the sleeving member may be limited by the limiting sleeve 53 to prevent lateral movement of the spring 7, and the front edge of the sleeving member may be limited by the first limiting bulge 54.

By the adoption of the above technical solution, connecting edges of the springs 7 sleeve the first limiting bulge 54 through the limiting sleeve 53 to achieve fast mounting of the springs 7.

Specifically, a second limiting bulge 55 is provided on a side of the first limiting bulge 54 away from the limiting sleeve 53. The sleeving member is limited by the first limiting bulge and the second limiting bulge. When the sleeving member sleeves the first limiting bulge, the front edge of the sleeving member may be confined between the first limiting bulge and the second limiting bulge to prevent the sleeving member from moving back and forth.

By the adoption of the above technical solution, the springs 7 are limited.

Embodiment 3

A difference between this embodiment and Embodiment 1 is as follows: Specifically, the rear cover 5 is provided with a connecting slot 52; a lower end of the connection terminal 6 is connected to a lower limiting block 62 corresponding to the connecting slot 52; and an upper limiting ring 61 is connected above the lower limiting block 62. A spacing between the upper limiting ring 61 and the lower limiting block 62 is slightly less than a thickness of a top plate of the rear cover 5, so that the connection terminal 6 will not rotate after being assembled. Due to the upper limiting ring 61 and the lower limiting block 62, the connection terminal 6 is electrically connected to the light source module 4 and the night light source 10.

By the adoption of the above technical solution, the lower limiting block 62 passes through the connecting slot 52, and the connection terminal 6 is then rotated 90 degrees, so as to achieve fast mounting of the connection terminal 6. The upper limiting ring 61 and the lower limiting block 62 are both made of rubber, which can also seal the connecting slot 52 to ensure the waterproof and shading effect of the whole lamp.

Embodiment 4

A difference between this embodiment and Embodiment 1 is as follows: Specifically, a washer 11 located on an outer side of the rear cover 5 is arranged above the surface ring 8, and a night light source 10 is connected to the outer side of the rear cover 5. The outer side of the rear cover 5 is connected to a light guide stand 9.

By the adoption of the above technical solution, the split side-emitting small panel lamp has the function of a small night lamp.

Specifically, several insertion buckles 91 are arranged at an edge of the light guide stand 9. The insertion buckles 91 may be distributed along the circumference of the light guide stand 9. The surface ring 8 is provided with insertion slots 83 corresponding to the insertion buckles 91. The insertion slots 83 may be distributed along the circumference of the surface ring 8.

By the adoption of the above technical solution, it is convenient for a quick connection between the light guide stand 9 and the surface ring 8.

Embodiment 5

A difference between this embodiment and Embodiment 1 is as follows: Specifically, the light source module 4 and the night light source 10 adopt an entire light source plate, and the rear cover 5 is provided with a notch 56 for allowing the light source plate to pass.

By the adoption of the above technical solution, the light source module 4 and the night light source 10 adopt the entire light source plate, so that one welding spot and one lead wire can be reduced in terms of production, and the production efficiency is improved.

In summary, the rear cover 5 and the surface ring 8 of the present disclosure are connected to each other after the clamping blocks 51 are rotated into the clamping slots 81, thus achieving fixation of the reflective sheet 3, the light guide plate 2, and the diffusion plate 1 inside, without connection by screws, so that the split side-emitting small panel lamp is more convenient to mount. Each clamping slot 81 of the present disclosure is of the side-opening structure, and the open end is connected to the barb 82, so that it is convenient to rotate the clamping blocks 51 into the clamping slots 81 to cause the barbs 82 to limit the clamping blocks 51 and prevent the rear cover 5 from being rotated out. The limiting sleeve 53 is connected above the rear cover 5 of the present disclosure, and the first limiting bulge 54 is arranged on the side surface of the limiting sleeve 53, so that connecting edges of the springs 7 sleeve the first limiting bulge 54 through the limiting sleeve 53 to achieve fast mounting of the springs 7.

In the present disclosure, the lower limiting block 62 passes through the connecting slot 52, and the connection terminal 6 is then rotated 90 degrees, so as to achieve fast mounting of the connection terminal 6. The upper limiting ring 61 and the lower limiting block 62 are both made of rubber, which can also seal the connecting slot 52 to ensure the waterproof and shading effect of the whole lamp. In the present disclosure, the washer 11 located on the outer side of the rear cover 5 is arranged above the surface ring 8; the night light source 10 is connected to the outer side of the rear cover 5; and the outer side of the rear cover 5 is connected to the light guide stand 9, so that the split side-emitting small panel lamp has the function of a small night lamp.

It should be finally noted that: The foregoing embodiments are merely preferred embodiments of the present disclosure, but not intended to limit the present disclosure. Although the present disclosure is described in detail with reference to the foregoing embodiments, a person of ordinary skill in the art may still make modifications to the technical solutions described in the foregoing respective embodiments or make equivalent replacements to partial technical features thereof. Any modification, equivalent replacement, and improvement made within the spirit and scope of the present disclosure shall fall within the protection scope of the present disclosure.

The invention claimed is:

1. A split side-emitting panel lamp, comprising a rear cover, wherein an inner wall of the rear cover is connected to a light source module; a reflective sheet, a light guide plate, and a diffusion plate are arranged inside the rear cover in sequence from top to bottom; a surface ring is connected below the rear cover, wherein one or more clamping blocks are arranged at an edge of the rear cover; the surface ring is provided with one or more clamping slots corresponding to the clamping blocks; a connection terminal is connected above the rear cover; and symmetrically arranged springs are further connected above the rear cover;

wherein the one or more clamping slots have an opening on one side, and an open end of the one or more clamping slots is connected to a barb that limits the one or more clamping blocks.

2. A split side-emitting panel lamp, comprising a rear cover, wherein an inner wall of the rear cover is connected to a light source module; a reflective sheet, a light guide plate, and a diffusion plate are arranged inside the rear cover in sequence from top to bottom; a surface ring is connected below the rear cover, wherein one or more clamping blocks are arranged at an edge of the rear cover; the surface ring is provided with one or more clamping slots corresponding to the clamping blocks; a connection terminal is connected above the rear cover; and symmetrically arranged springs are further connected above the rear cover, wherein each spring comprises connecting edges forming a sleeving member, a limiting sleeve is connected above the rear cover, a first limiting bulge is arranged on a side of the limiting sleeve, and the sleeving member sleeves the first limiting bulge by passing through the limiting sleeve.

3. The panel lamp according to claim 2, wherein a second limiting bulge is provided on a side of the first limiting bulge away from the limiting sleeve, and the sleeving member is limited by the first limiting bulge and the second limiting bulge.

4. The panel lamp according to claim 1, wherein the rear cover is provided with a connecting slot; a lower end of the connection terminal is connected to a lower limiting block corresponding to the connecting slot; and an upper limiting ring is connected above the lower limiting block.

5. The panel lamp according to claim 1, wherein a washer located on an outer side of the rear cover is arranged above the surface ring, and a night light source is connected to the outer side of the rear cover.

6. A split side-emitting panel lamp, comprising a rear cover, wherein an inner wall of the rear cover is connected to a light source module; a reflective sheet, a light guide plate, and a diffusion plate are arranged inside the rear cover in sequence from top to bottom; a surface ring is connected below the rear cover, wherein one or more clamping blocks are arranged at an edge of the rear cover; the surface ring is provided with one or more clamping slots corresponding to the clamping blocks; a connection terminal is connected above the rear cover; and symmetrically arranged springs are further connected above the rear cover, wherein a washer located on an outer side of the rear cover is arranged above the surface ring, a night light source is connected to the outer side of the rear cover and the outer side of the rear cover is connected to a light guide stand.

7. The panel lamp according to claim 6, wherein one or more insertion buckles are arranged at an edge of the light guide stand, and the surface ring is provided with one or more insertion slots corresponding to the insertion buckles.

* * * * *